United States Patent [19]

Tamura et al.

[11] Patent Number: 4,669,168
[45] Date of Patent: Jun. 2, 1987

[54] METHOD AND SYSTEM FOR AUTOMATICALLY ATTACHING WORKS ONTO VEHICLE BODIES CARRIED ON A CONVEYOR

[75] Inventors: Kinichi Tamura, Mitaka; Yoshitada Sekine, Houya; Fumiki Yokota, Yamato, all of Japan

[73] Assignee: Nissan Motor Company, Limited, Yokohama, Japan

[21] Appl. No.: 794,764

[22] Filed: Nov. 4, 1985

[30] Foreign Application Priority Data

Nov. 5, 1984 [JP] Japan ............................. 59-232871

[51] Int. Cl.[4] ............................................. G05B 19/42
[52] U.S. Cl. ...................................... 29/429; 29/709; 29/823; 901/7
[58] Field of Search ................. 29/429, 430, 709, 711, 29/712, 822, 823, 771, 783; 901/1, 7; 318/640; 156/108, 578

[56] References Cited

U.S. PATENT DOCUMENTS

| | | | |
|---|---|---|---|
| 3,654,616 | 4/1972 | Dunne et al. | 901/7 |
| 3,818,290 | 6/1974 | Harper et al. | 901/7 |
| 4,254,433 | 3/1981 | Dewar, Jr. | 901/7 |
| 4,449,084 | 5/1984 | Meno | 318/640 |
| 4,564,410 | 1/1986 | Clitheros et al. | 156/578 |

FOREIGN PATENT DOCUMENTS

| | | | |
|---|---|---|---|
| 2359450 | 3/1978 | France | 901/7 |
| 2510933 | 2/1983 | France | 29/709 |
| 1405651 | 7/1972 | United Kingdom . | |
| 2075217 | 1/1981 | United Kingdom . | |
| 2121561 | 5/1983 | United Kingdom . | |

Primary Examiner—Lowell A. Larson
Attorney, Agent, or Firm—Schwartz, Jeffery, Schwaab, Mack, Blumenthal & Evans

[57] ABSTRACT

A method and system for automatically attaching works to respective vehicle bodies carried on a slat conveyor using a robot. The method comprises the steps of (a) providing a base on which the robot is mounted and which is movable within a movement range, at least one part of which is alongside of the conveyor; (b) providing work feeders for sequentially feeding plural kinds of the works which are different according to vehicle types (sedan, hardtop, etc.) of the vehicle bodies to predetermined positions; (c) identifying the vehicle type of one of the vehicle bodies to which the required work is to be attached at a first position; (d) determining a target position according to the identified vehicle type; (e) controlling the robot so as to grasp the required work from the work feeders at the target position; (f) positioning the robot to a stand-by position along the conveyor; (g) detecting sequentially a deviation of a relative position toward a direction of travel of the conveyor between a tracking point and reference point since the vehicle body has arrived at a second position downstream of the first position; and (h) moving the base to follow the conveyor so that the deviation becomes zero and simultaneously controlling the robot so as to attach the grasped work to the vehicle body.

16 Claims, 12 Drawing Figures

METHOD AND SYSTEM FOR AUTOMATICALLY ATTACHING WORKS ONTO VEHICLE BODIES CARRIED ON A CONVEYOR

BACKGROUND OF THE INVENTION

1. Field of the Invention

The present invention relates to a method and system for automatically attaching works to main assemblies such as vehicle bodies which are continuously being carried on a conveyor.

2. Description of the Prior Art

In a vehicle's assembly line of a recent automotive manufacturing factory, such attaching operations for various works (windshields, combination lamps, seats, and so on) to vehicle bodies which are sequentially carried on, e.g., a slat conveyor moved at a predetermined speed, are carried out with an operator or operators at each operation stage of required works attaching a given work selected by reference to a production specification card prepared for each vehicle body. Each operator rises on a man conveyor moved in synchronization with the slat conveyor. However, recently there is a strong demand for such attachment operations of various works to vehicle bodies to be automated with an industrial robot in place of the operator.

To answer such a demand, it has been proposed that, e.g., a technique of factory automation (FA) over an entire assembly line which is recently being put into practice at various manufacturing factories be applied to such work attachment operations.

When the factory automation technique over the entire assembly line is applied, however, there are many problems in terms of technological difficulty and cost performance since it becomes necessary to construct a large scale and systematic factory automation line including highly intelligent robots to be newly developed.

In addition, since an enormous amount of costs is required to reconstruct installations and the automotive assembly factory is relatively large in scale as compared with other manufacture factories (e.g., manufacturing factories in electric appliances), it is desirable to maintain the existing installations except for a new installation of the factory. The above factory automation technique does not satisfy the above desired requirements.

Under such circumstances, a technique suitable for such automotive manufacturing factories has been demanded which satisfies the following five conditions:

(a) requiring little change in installations;
(b) capable of being readily put into practice in the current assembly line;
(c) utilizing recently developed robots without reconstruction;
(d) capable of utilizing a robot irrespectively of its kind; and
(e) being low in cost.

SUMMARY OF THE INVENTION

It is, therefore, an object of the present invention to provide a new apparatus and method which satisfies all of the above five conditions.

The above-described object can be achieved by providing a method for automatically attaching works to vehicle bodies carried on a conveyor, comprising the steps of:

(a) providing a base on which a robot is mounted and which is movable within a predetermined range, at least one part of the movement range being alongside of the conveyor;

(b) providing a plurality of works feeders for sequentially feeding plural kinds of the works which are respectively different according to vehicle types of the vehicle bodies carried on the conveyor to predetermined positions along the movement range of the movable base;

(c) identifying the vehicle type of one of the vehicle bodies which has passed through a first position of the conveyor at an upstream of the part of movement range of the movable base along the conveyor when the vehicle body has passed through the first position;

(d) determining a target position in the movement range of the movable base corresponding to one of the predetermined positions to which the corresponding works feeder feeds the required works on the basis of the identification result in the step (c) and positioning the movable base to the target position;

(e) playing back the robot so as to grasp one of the sequentially fed required works from the works feeder at the target position;

(f) moving the movable base from the target position to position it at a stand-by position of the part of movement range along the conveyor at which the movable base waits for a tracking operation to start;

(g) detecting sequentially a deviation of a relative position toward a carrying direction of the conveyor between at least one predetermined tracking point of the conveyor side and a reference point of the movable base side from a predetermined timing since one of the vehicle bodies which has passed through the first position has arrived at a second position of the conveyor at a downstream of the first position; and (h) moving the movable base to follow the conveyor so that the detected deviation of the relative position becomes zero in step (g) and simultaneously playing back the robot so as to attach the grasped work to a predetermined portion of the vehicle body.

BRIEF DESCRIPTION OF THE DRAWINGS

A more complete understanding of the present invention may be obtained from the subsequent detailed description taken in conjunction with the attached drawings in which like reference numerals designate corresponding elements and in which.

DETAILED DESCRIPTION OF THE PREFERRED EMBODIMENTS

Reference will hereinafter be made to the drawings in order to facilitate understanding of the present invention.

Figure 1:
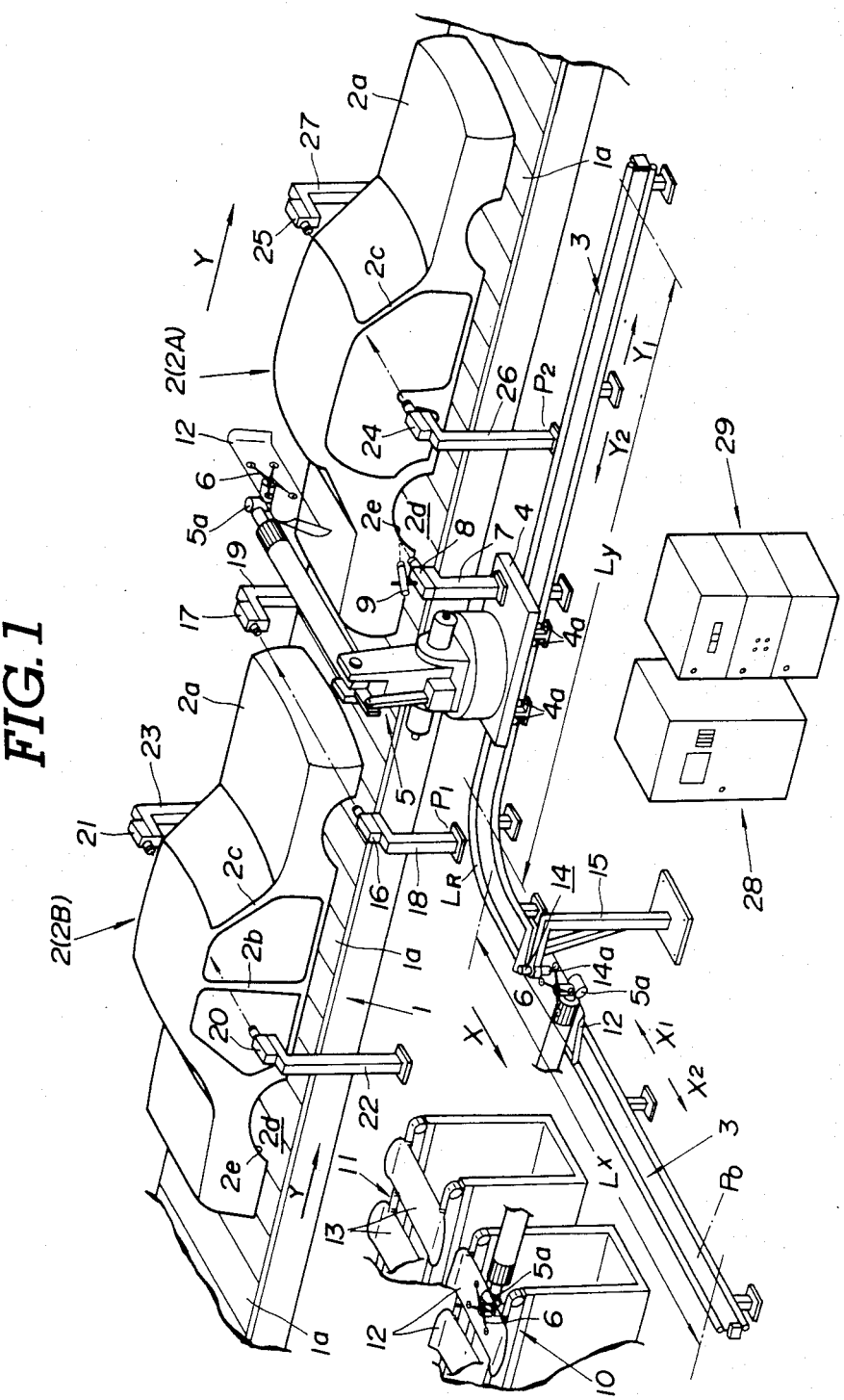
FIG. 1 is a perspective view of an attachment operation of a rear windshield to each vehicle body on a conveyor to which the present invention is applicable.

FIG. 1 shows an operation stage (working station) of attaching rear windshields of two types to vehicle bodies of different models to which the present invention is applicable.

In FIG. 1, a slat conveyor 1 is moved continuously in such a way that each slat 1a constituting the conveyor 1 is actuated at a predetermined speed (for example, 2.2 meters/minute) along a direction denoted by an arrow lettered Y by means of a chain (not shown). A jig (not shown) for mounting each vehicle body is attached at each predetermined interval of distance on any of the slats 1a of the slat conveyor 1. The vehicle body 2 is mounted at a predetermined orientation on a predetermined position of each jig. The conveyor 1 thus sequentially carries the mounted vehicle body at the predetermined speed along the Y indicated direction.

In FIG. 1, a vehicle model of the vehicle body 2 at a forward travelling direction of the slat conveyor 1 is a hardtop and another vehicle model of the vehicle body 2 upstream of the hardtop vehicle body 2 is a sedan. The hardtop vehicle body is hereinafter denoted by 2A and sedan vehicle body is denoted by 2B.

In FIG. 1, a rail (monorail) 3 is extended on a floor of the operation stage on which a movable base 4 to be described later runs. One moving range Ly of the rail extends along the arrow-marked Y in the carrying direction of the slat conveyor 1 and another moving range Lx extends along another direction denoted by X which is perpendicular to the Y-indicated carrying direction and is connected thereto via a curved portion $L_R$.

The movable base 4 can freely be moved on the rail 3. That is to say, the movable base 4 is moved in either directions $Y_1$, $Y_2$ within the moving range Ly and in either directions $X_1$, $X_2$ within the moving range Lx by means of, for example, a rotational force of a motor (not shown) mounted on a lower surface of the base 4 which is transmitted to a pinion gear via a low gear ratio transmission, the pinion gear being meshed with a rack gear installed on the rail 3. A set of four guide rollers 4a (partly shown) sandwiching the rail 3 assures a stable run of the movable base 4 along the rail 3. It should be noted that an output axle of a motor driving the movable base 4 is provided with a pulse generator and tachogenerator for controlling the motor.

It should also be noted that an origin of the movable base 4 is located at a position Po in the vicinity of one end of its one moving range Lx. A limit switch (not shown) for detecting and informing that the movable base 4 is returned to the origin Po is placed on the origin Po.

Furthermore, a known multi-articulated robot 5 having a carpus at a tip of which an absorbating (suction type) hand 6 is attached is fixedly mounted on the movable base 4. The robot 5 utilizes the suction type hand 6 to suck and grasp tightly a rear windshield 12 as shown in FIG. 1 in a way as described later.

Next, the movable base 4 is provided with a post 7 fixed so as not to disturb the movement of the robot 5, on an upper end of which a tracking position detector 8 comprising a line image sensor to be described later, an actuation detection processing circuit, and spot light source are mounted.

It should be noted that the line image sensor in the tracking position detector 8 is arranged such that its elongated direction is in parallel with the Y indicated direction when the movable base 4 moves along its moving range Ly and a center position of a light receiving portion in a line form is set as a reference point for the movable base 4.

The relationship in positions between the tracking position detector 8 and spot light source 9 is such that when the spot light emitted from the spot light source 9 is reflected against part of the vehicle body 2, the reflected light becomes incident on the line image sensor in the tracking position detector 8.

Rear windshield feeders 10, 11 are respectively arranged in the vicinity of the rail 3 at predetermined positions on the floor shown in FIG. 1 along the moving range Lx of the movable base 4. The one rear windshield feeder 10 feeds each rear windshield 12 for the hardtop vehicle body 2A sequentially and intermittently and the other 11 feeds each rear windshield 13 for the sedan vehicle body 2B in the similar way. Both feeders 10, 11 are interlocked to feed the vehicle parts (required works) intermittently at a timing, e.g., when the robot 5 sucks and grasps a required one of the rear windshields sequentially fed with its hand 6 to take up it from the respective feeders.

In addition, an adhesive applicator 14 which applies a given amount of adhesive over such windshield is attached on a post 15 mounted on a predetermined position opposite to the feeders 10, 11 sandwiching the rail 3 shown in FIG. 1 along its moving range Lx. The adhesive applicator 14 causes outflow of adhesive from its nozzle 14a in response to a command from an applicator controller to be described later. A transparent-type optoelectrical switch comprises light emitter 16 and receiver 17. The light emitter 16 and receiver 17 are mounted so as to face each other sandwiching the slat conveyor 1 between respective upper ends of both posts 18, 19 each installed at a first (predetermined) position $P_1$ shown in FIG. 1 upstream of the moving range Ly. The heights of the emitter 16 and receiver 17 are such that light passing from the emitter 16 to the receiver 17 is obstructed by a front body portion 2a of each vehicle body 2A, 2B. The optoelectrical switch thus turns on when the light passage is obstructed by the front body portion 2a.

Another transparent-type optoelectrical switch is provided which comprises similarly a light emitter and receiver pair 20, 21.

The light emitter 20 and receiver 21 are mounted on respective upper ends of posts standing on positions at which center pillars at both lateral sides of the vehicle body 2B arrive when the front portion 2a of the sedan vehicle body 2B has been carried to the light path of the optoelectrical switch comprising the light emitter 16 and receiver 17 located at the first position $P_1$. The heights of the posts 22, 23 are such that the light path from the emitter 20 to the receiver 21 is obstructed by the center pillars 2b of the sedan type vehicle body 2B. The optoelectrical switch is turned on when the light passage thereof is obstructed by the center pillars. The optoelectrical switches comprising light emitter 16 and receiver 17 and light emitter 20 and receiver 21 constitute a detection system for generating data for identifying the vehicle model (sedan or hard-top) of the vehicle body.

Furthermore, still another transparent optoelectrical switch is provided which comprises light emitter 24 and receiver 25. These units are located on upper ends of posts 26, 27 installed so as to face each other sandwiching the slat conveyor 1 at a second (predetermined) position $P_2$ which is downstream of the first positiion $P_1$. The height of the optoelectrical switch is such that the light path from the emitter 24 to the receiver 25 is obstructed by front pillars at both front sides of the vehicle bodies 2A, 2B. The optoelectrical switch comprising the emitter 24 and receiver 25 is turned on when the light passage is obstructed by such front pillars. A stand-by position for starting a tracking operation in the moving range Ly of the movable base 4 is defined as follows. That is, the stand-by position is a position on the rail 3 at which the movable base 4 stops and at which the spot light from the spot light source 9 falls through any position within spaces along rear wheel houses 2d of either of the vehicle bodies 2A, 2B.

The optoelectrical switch comprising the light emitter 24 and light receiver 25 at the second position $P_2$ constitutes a detection system for generating a preparation signal $S_B$ to be described later for producing a preparation timing to start the tracking operation of the movable base 5. In addition, side edges 2e of rear wheel houses 2d of the vehicle bodies 2A, 2B are tracking points for the slat conveyor 1.

A switch signal of the optoelectrical switch comprising the light emitter 16 and receiver 17 at the first position $P_1$ ("1" when the optoelectrical switch is turned on and "0" when the optoelectrical switch is turned off) is denoted by $Q_1$, a switch signal of the optoelectrical switch comprising the light emitter 20 and receiver 21 is denoted by $Q_2$ ("1" when turned on and "0" when turned off), and a switch signal of the optoelectrical switch comprising the light emitter 24 and receiver 25 at the second position $P_2$ is denoted by $Q_3$ ("1" when turned on and "0" when turned off), respectively.

A robot controller 28 for controlling behavior of the robot 5 and another controller 29 are installed aside the rail 3 as shown in FIG. 1. The controller 29 comprises a microcomputer for controlling a whole operation of a travel controller of the movable base 4 which controls the rotation of the above-described motor for the actuation of the movable base 4, an applicator controller 32 which controls the adhesive applicator 14, and other controllers including the robot controller 28.

The construction of a control system comprising the controllers 28, 29 will be described in detail below with reference to FIGS. 2 through 5.

The microcomputer 30, travel controller 31, and applicator controller 32 constitute the other controller 29 shown in FIG. 1. The microcomputer 30 comprises a Central Processing Unit (CPU) 33, a Read-Only Memory (ROM) 34, a Random Access Memory (RAM) 35, and Input/Output Unit (I/O) 36.

The microcomputer 30 is communicated with the robot controller 28 using a robot operation direction programmed command data RP, and robot operation start command SSR issued from the microcomputer 30 and operation completion signal SE and whole operation completion signal SEE issued from the robot controller 28.

In addition, the microcomputer 30 issues a clock start/stop command $S_1$, detection start command $S_2$, and detection stop command $S_3$ to the actuation detection processing circuit 38 for controlling the line image sensor 37, a tracking mode signal $S_T$ to an analog switch 46 of the travel controller 31, a positioning mode signal Sp to another analog switch 41, a positioning mode signal $SM_1$ and tracking mode signal $SM_2$ to a positioning controller 39 within the travel controller 31 and further movement point (target position) data (Px) to the positioning controller 39.

The microcomputer 30, in turn, receives an actuation signal Ss, vehicle model data signal $S_A$, and preparation signal $S_B$, tracking start timing signal $S_c$ from the actuation detection processing circuit 38, the positioning completion signal $S_N$ and current position data [PPx] from the positioning controller 39, and an origin position signal So from the limit switch 47 described above for detecting the condition that the movable base 4 is at the origin Po shown in FIG. 1.

The travel controller 31 receives the positioning mode signal Sp from the microcomputer 30, tracking mode signal $S_T$, positioning mode signal $SM_1$, tracking mode signal $SM_2$, and movement position data signal [Px] from the microcomputer 30, a relative position deviation signal $\Delta Sy$ from the actuation detection processing circuit 38, a reference speed signal Sv which corresponds to the carrying speed of the slat conveyor 1 shown in FIG. 1 from the tachogenerator 48 for detecting the speed of the line (slat conveyor 1), a speed feedback signal 5 V and feedback pulse signal Fp from a tachogenerator 50 and pulse generator 51 attached to an output axle of the motor 49 for actuating the base 4 shown in FIG. 1 to move. Further, travelling controller 31 receives the origin signal So from the limit switch 47 for detecting that the base 4 has reached the origin Po.

It should be noted that the tachogenerator 48 for detecting the line speed, i.e., the carrying speed of that slat conveyor 1 is linked, e.g., with a rotation wheel axle of a line end of the slat conveyor 1 shown in FIG. 1 via a speed-increasing gear, thus generating the reference speed signal Sv which corresponds to the carrying speed of the slat conveyor 1.

Figure 2:
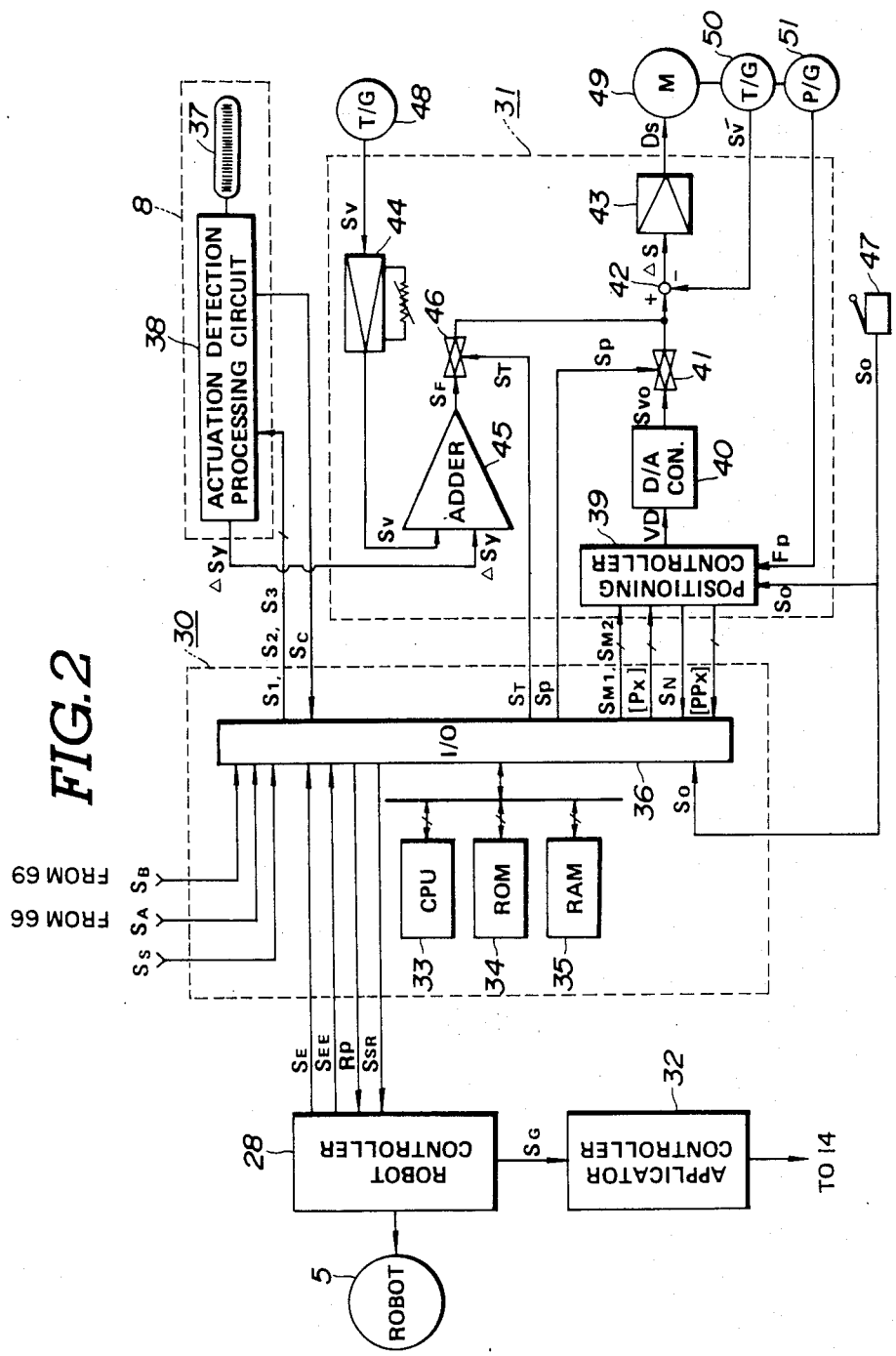
FIG. 2 is a schematic block diagram of a control system comprising two control apparatus 28, 29 shown in FIG. 1.

The travel controller 31 comprises, as shown in FIG. 2, the positioning controller 39, a digital-to-analog converter (D/A CON.) 40, the analog switch 41, an adder 42, an amplifier 43, a gain adjustment amplifier 44, an adder 45, and the analog switch 46 each function being described later.

While receiving the tracking mode signal $SM_2$ from the microcomputer 30, the positioning controller 39 stops the positioning control and calculates only the current position PPx of the movable base 4 on the basis of the pulse signal Fp from the pulse generator 51.

While receiving the positioning mode signal $SM_1$ from the microcomputer 30, the positioning controller 39 outputs a speed command data VD sequentially which corresponds to a deviation of a movement position data [Px] from the microcomputer 30 from the current position data [PPx] of the movable base 4 which is calculated from the pulse generator 51 to control the rotation of the motor 49 to position (stop) the movable base 4 at a target position indicated by the movement point data [Px] from the microcomputer 30.

It should be noted that the positioning controller 39 confirms that the movable base 4 has returned to the origin Po in response to the origin signal So from the limit switch 47 and calibrates the stop position of the movable base 4 to the origin Po. The D/A converter 40 converts the speed command data VD from the positioning controller 39 into a corresponding speed command signal Svo in analog form.

The analog switch 41 is turned on only when the positioning mode on signal Sp from the microcomputer 30 is inputted thereto to output the speed command signal Svo from the D/A converter 40 to the adder 42.

The adder 42 outputs a deviation signal ΔS based on a difference between either the speed command signal Svo from the analog switch 41 or addition signal $S_F$ to be described later from the analog switch 46 and the speed feedback signal Sv' from the tachogenerator 50 attached to the output axle of the motor 49. The amplifier 43 amplifies the deviation signal ΔS to be sent to the motor 49.

The gain adjustment amplifier 44 adjusts a gain of the reference speed signal Sv from the tachogenerator 48.

The adder 45 adds the relative position deviation signal ΔSy outputted from the actuation detection processing circuit 38 to the reference speed signal Sv outputted from the gain adjustment amplifier 44 and outputs the addition result as the addition signal $S_F$.

It should be noted that since the relative position deviation signal ΔSy is positive or negative, $S_F>Sv$ when ΔSy is positive and $S_F<Sv$ when ΔSy is negative. The analog switch 46 is turned on only when the tracking mode signal $S_T$ is input from the microcomputer 30. The addition signal $S_F$ from the adder 45 is outputted to the adder 42.

Figure 3:
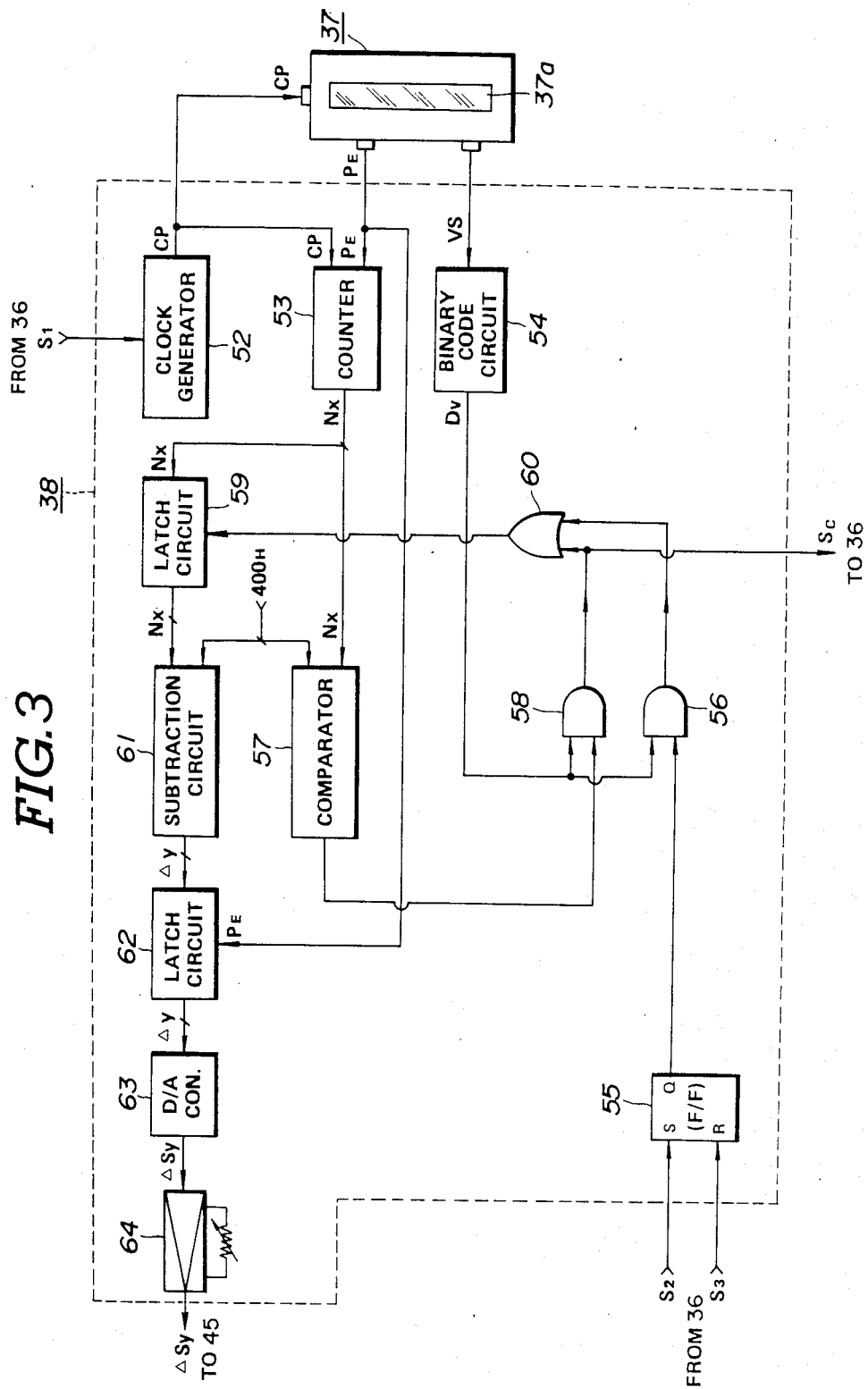
FIG. 3 is a circuit block diagram of an actuation detection processing circuit 38 shown in FIG. 2.

The line image sensor 37 of the tracking position detector 8 comprises a MOS (Metal Oxide Semiconductor) type or CCD (Charge Coupled Device) type image sensor having, e.g., 2048 ($2^{11}$) picture elements (bits) which outputs sequentially a video output Vs according to the light received with a light receiving section 37a shown in FIG. 3 through an internal scanning circuit.

The actuation detection processing circuit 38 of the tracking position detector 8 comprises a clock generator 52, counter 53, binary code circuit 54, set/reset flip-flop circuit (F/F) 55, AND gate circuits 56, 58, comparator 57, OR gate circuit 60, latch circuit 59, subtraction circuit 61, latch circuit 62, D/A converter 63, and gain adjustment amplifier 64.

The clock generator 52 operates when the clock start/stop command $S_1$ from the microcomputer 30 indicates a clock start (, e.g., "1") and thus outputs the clock signal cp having a predetermined frequency (, e.g., 2.5 megahertz) to an input terminal of the line image sensor 37 and stops when the clock start/stop command $S_1$ indicates a clock stop (, e.g., "0").

The counter 53 counts the clock signal cp from a clock generator 52 to detect a position of a picture element scanned in the line image sensor 37, the count value Nx being reset in response to the last bit output $P_E$ from the line image sensor 37.

The counter 53 is a binary counter having a capacity of at least 12 bits and capable of counting more than 2048 in decimal representation (800 in hexadecimal).

The binary code circuit 54 compares a video output VS for each picture element output from the line image sensor 37 sequentially in synchronization with the clock signal cp with a predetermined slice level (binary code level) and outputs a binary coded video data Dv which is at a "1" when the video output VS is equal to or more than the slice level and which is at a "0" when the video output VS is lower than the slice level.

The flip-flop circuit 55 is set in response to a detection start command $S_2$ from the microcomputer 30 and is reset in response to a detection stop command $S_3$ from the microcomputer 30.

The AND circuit 56 outputs a logic level of "1" only when the Q output of the F/F 55 is "1" and binary code video output Dv is also "1".

The comparator 57 compares the count value Nx of the counter 53 with a value of 1024 (2048/2) in decimal representation (400 in hexadecimal) indicating a center picture element position of the line image sensor 37 (, i.e., a reference point for the movable base 4) and outputs a "1" only when Nx=400 in hexadecimal representation.

The AND circuit 58 outputs a level of "1" only when the output value of the comparator 57 is at a "1" and the binary coded video output level Dv from the binary code circuit 54 is also "1".

It should be noted that the output of "1" from the AND circuit 58 is output to the microcomputer 30 as the tracking start timing signal Sc.

The latch circuit 59 lates the count value Nx of the counter 53 when the output of either AND gate circuit 56 or 58 via an OR gate circuit 60 changes from a "0" to a "1".

The substraction circuit 61 subtracts the value of 400 in hexadecimal representation indicating the center picture element position of the line image sensor 37 described above from the count value latched in the latch circuit 59 and outputs the result of subtraction as the relative position deviation data Δy.

The latch circuit 62 latches the relative position deviation data Δy (positive or negative) from the subtraction circuit 61 whenever the last bit $P_E$ is outputted from the line image sensor 37.

The D/A converter 63 converts the relative position deviation data Δy latched in the latch circuit 62 into an analog relative position deviation signal ΔSy and the gain adjustment amplifier 64 adjusts the analog relative position deviation signal ΔSy in terms of gain and outputs the gain adjusted relative position deviation signal ΔSy to the adder 45 in the travel controller 31 shown in FIG. 2.

It should be noted that the actuation signal Ss, vehicle model data signal $S_A$, and preparation signal $S_B$ to be input to the microcomputer 30 are formed as follows.

The actuation signal Ss shown in FIG. 2 is a signal formed when a power switch (not shown) installed on the controller 29 shown in FIG. 1 is turned on by an operator.

Figure 4:
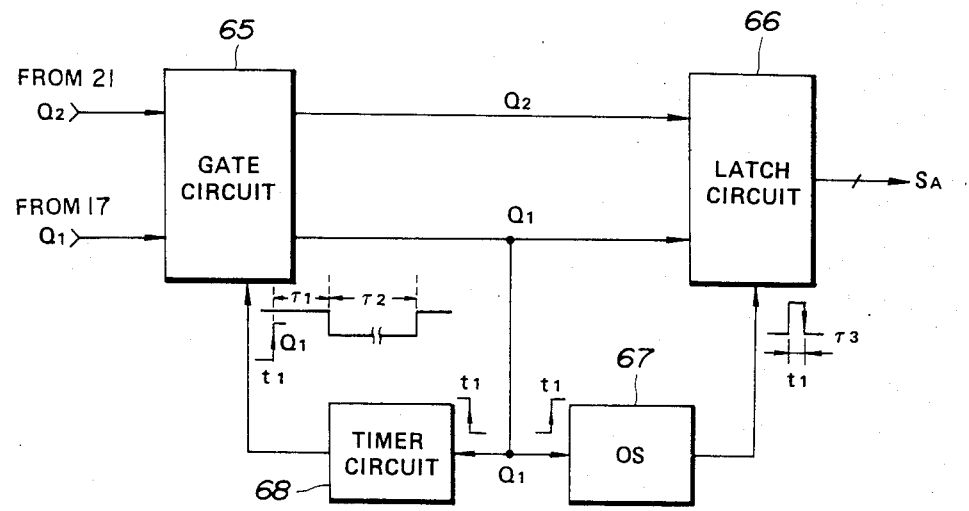
FIG. 4 is a circuit block diagram of a circuit forming a vehicle model data signal $S_A$ to be inputted to a microcomputer 30 shown in FIG. 2.

The vehicle model data signal $S_A$ shown in FIG. 2 is derived from a processing circuitry comprising a gate circuit 65, latch circuit 66, one-shot multivibrator (OS) 67, and timer circuit 68 as shown in FIG. 4 and the processing circuitry processes switch signals $Q_1$, $Q_2$ from the one optoelectrical switch comprising the above-described light emitter 16 and receiver 17 and the other optoelectrical switch comprising the light emitter 20 and receiver 21.

That is to say, the gate circuit 65 shown in FIG. 4 opens when the output level of the timer circuit 68 is at a "1" and closes when the output thereof is at a "0". Although the output level of the timer circuit 68 is always at a "1", the timer circuit 68 is actuated to output the "1" level at a time $t_1$ when the switch signal $Q_1$ passed through the gate circuit 65 is raised from "0" to "1", i.e., at the time $t_1$ when a tip of the front body 2a of either vehicle body 2A or 2B has arrived at the light passage of the optoelectrical switch located at the first position $P_1$ and the optoelectrical switch is turned on and thereafter is turned to a "0" only for a time duration $\tau_2$ required for the vehicle body 2A or 2B when a constant time $\tau_1$ has passed from the time $t_1$ to pass completely through the light passage of the optoelectrical switch at the previous first position $P_1$.

The latch circuit 66 latches the switch signals $Q_1$, $Q_2$ passing through the gate circuit 65 at a timing when a pulse having a pulsewidth $\tau_3$ from the one-shot multivibrator 67 which is triggered on a rising edge from a "0" to a "1" transition of the switch signal $Q_1$ passing through the gate circuit 65 ($\tau_3 < \tau_1$, i.e., shorter than a time duration during which the light passage of the optoelectrical switch comprising the light emitter 20 and receiver 21 is obstructed by the center pillars 2b). The latched signal is thus output as the vehicle model data signal $S_A$ at the subsequent latch timing.

Hence, the vehicle model data signal $S_A$ indicates "11" if the vehicle model of the vehicle body 2 passing through the first position $P_1$ is a sedan ($Q_1$, $Q_2$="1") and "10" if the vehicle model is hardtop (four-door hardtop) ($Q_1$="1", $Q_2$="0").

Figure 5:
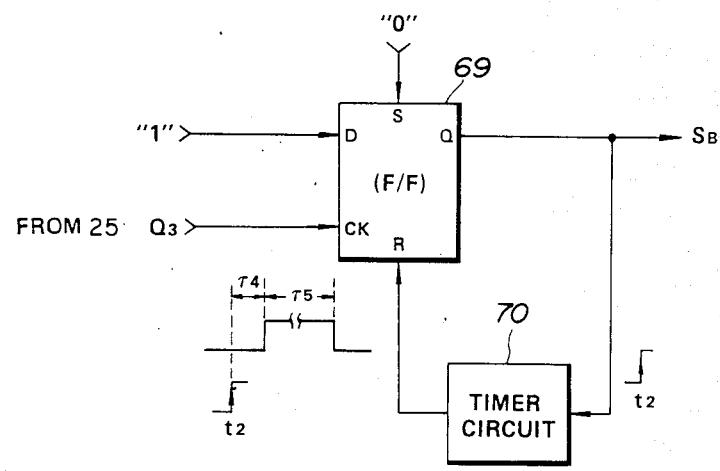
FIG. 5 is a circuit block diagram of a circuit forming a preparation signal $S_B$ to be inputted to the microcomputer 30 shown in FIG. 2.

On the other hand, the preparation signal $S_B$ is a signal derived from a processing circuit comprising, as shown in FIG. 5, a D-type flip-flop circuit (F/F) 69 with Reset/Set input terminals and timer circuit 70 and which processes the signal $Q_3$ of optoelectrical switch located at the second position $P_2$, the optoelectrical switch comprising the light emitter 24 and receiver 25 as shown in FIG. 1.

That is to say, the flip-flop (F/F) circuit 69 inputs the switch signal $Q_3$ at a positive-edge going type clock terminal CK with the D terminal at a "1", the S terminal at a "0", and R terminal receiving an output signal of a timer circuit 70. The timer circuit 70 is actuated at a time $t_2$ when the Q output of the F/F 69 which serves as the preparation signal $S_B$ rises from "0" level to "1" level, i.e., at the time $t_2$ when the front pillars 2c of either of the vehicle bodies 2A or 2B has reached the light passage of the optoelectrical switch located at the second position $P_2$ and the optoelectrical switch is turned on, thereafter produces a "0" output at a time when a constant time duration $\tau_4$ has passed from the time $t_2$, and continues the "0" output for a time duration $\tau_5$ required for either of the vehicle bodies 2A or 2B to pass completely through the light path of the optoelectrical switch located at the second position $P_2$.

Hence, the preparation signal $S_B$, the Q output of the flip-flop (F/F) circuit 69, rises from "0" to "1" level when the front pillars 2c of either of the vehicle bodies 2A or 2B have passed through the light path of the optoelectrical switch located at the second position $P_2$, continues the "1" level for the constant time duration $\tau_4$, and thereafter falls to a "0" and continues the "0" level until the subsequent front pillars 2c obstruct the above-described light passage.

The applicator controller 32 shown in FIG. 2 spreads the given amount of adhesive from the nozzle 14a of the applicator 14 through the actuation of the applicator 14 shown in FIG. 1 only during the outputting of an application command $S_G$ issued from the robot controller 28.

Next, a behavior of the slat conveyor 1 in operation shown in FIG. 1 will be described before the action of the whole embodiment is described.

Figure 6:
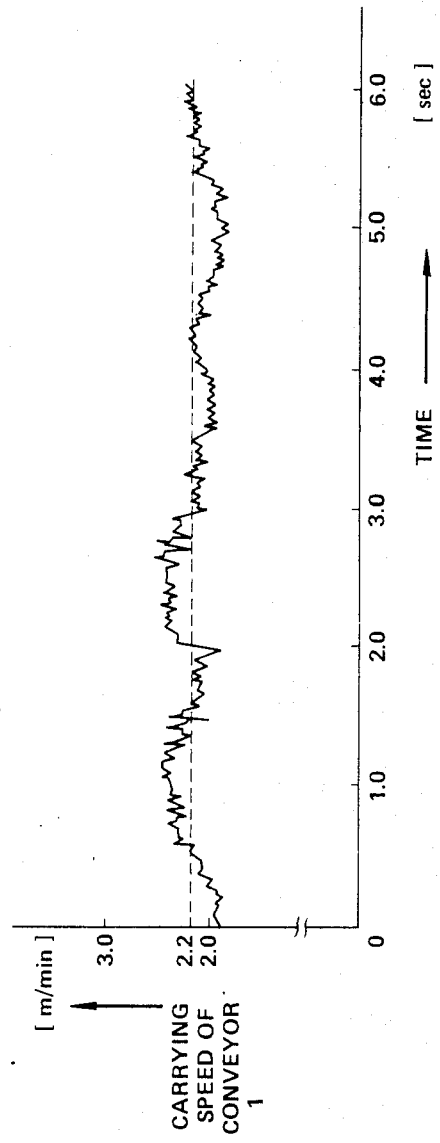
FIG. 6 is a graph showing variations in carrying speed of a slat conveyor shown in FIG. 1 with respect to time.

Although the salt conveyor 1 apparently moves at a constant speed by means of a chain (not shown), the carrying speed of the conveyor 1 is considerably varied with time, for example, as appreciated from FIG. 6, due to a spring constant of the chain and other factors such as friction of the movable portion of the conveyor 1.

Therefore, when the movable base 4 is tracked within the moving range Ly to follow the slat conveyor 1, the attachment operation of the rear windshield to each vehicle body by means of the robot cannot accurately be carried out if the movement speed of the movable base 4 corresponds to a set carrying speed (for example, 2.2 meters/minutes).

To cope with such a problem as described above, the reference speed signal Sv produced from the tachogenerator 48 which substantially corresponds to the speed of the slat conveyor 1 is corrected sequentially with the relative position deviation signal $\Delta Sy$ detected by the tracking position detector 8. This correction for the speed variations will be described later.

An action of the whole system in the preferred embodiment will be described below with additional reference to FIGS. 7(A) through FIG. 9(C).

Suppose that each optoelectrical switch shown in FIG. 1 is operated so as to emit the light, e.g., when the salt conveyor 1 is actuated, the movable base 4 shown in FIG. 1 is placed at the origin Po, and the robot 5 is returned to its operation origin. In addition, the slat conveyor 1 carries vehicle bodies of only hardtop and sedan models.

Figure 7A:
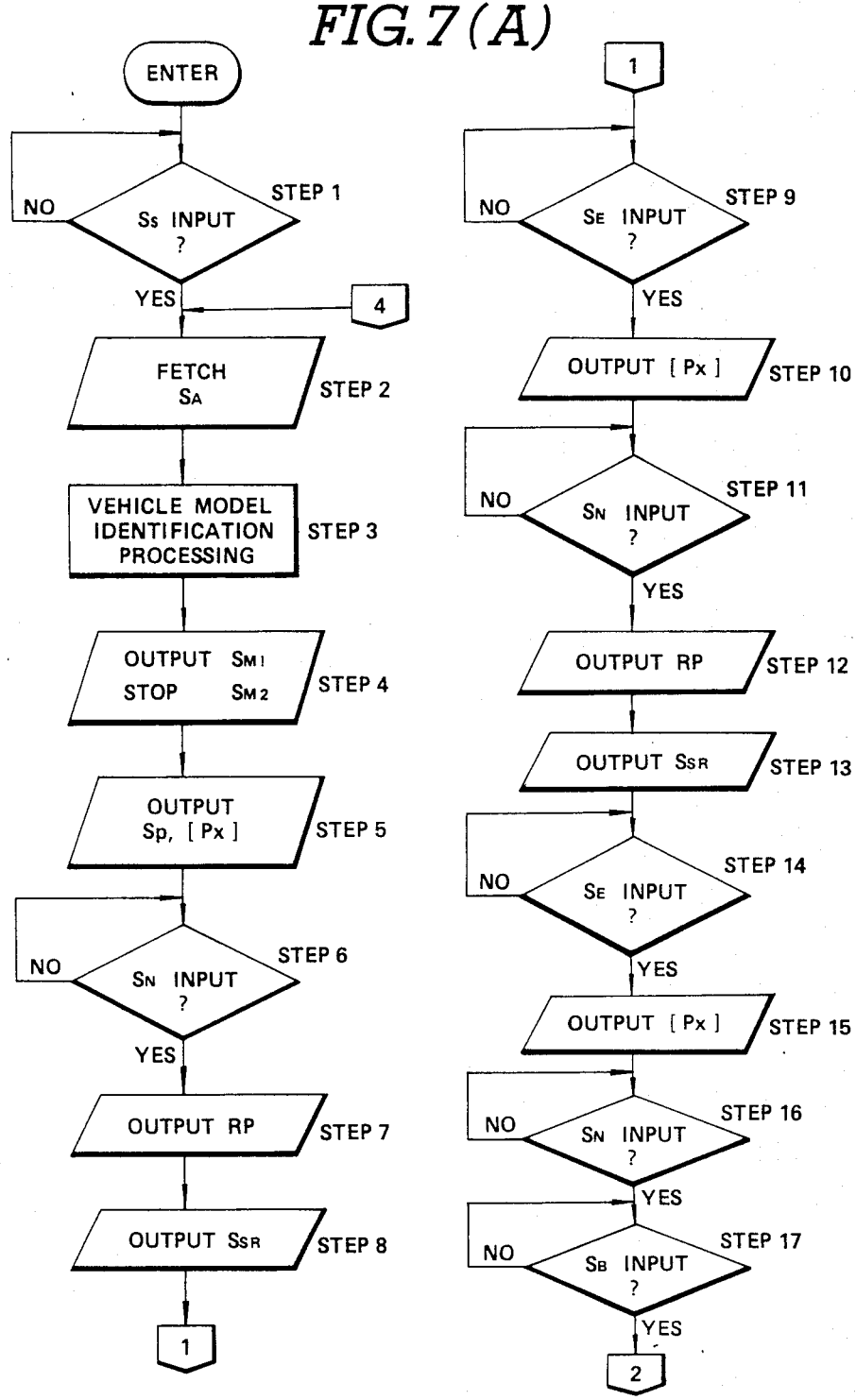
FIGS. 7(A) and 7(B) are an integral processing flowcharts of a program executed in a CPU 33 of the microcomputer 30 shown in FIG. 2.

The CPU 33 of the microcomputer 30 in the controller 29 first carries out a predetermined initialization (not shown) processing when the power switch is turned on and waits for the input of the actuation signal Ss at a STEP 1 in the processing flow chart of a program shown in FIG. 7(A) and retrieves the vehicle model data signal $S_A$ at a STEP 2 when the actuation signal Ss is received. It should be noted that the fetech processing of STEP 2 is synchronized with the timing slightly delayed from the occurrence of the falling edge of the output pulse of the one-shot multivibrator 67 shown in FIG. 5.

Furthermore, suppose that the hardtop vehicle body 2A is first to be brought on the slat conveyor 1, the two optoelectrical switches identify that the vehicle model is the hardtop at a time when the tips of the front body 2a of the vehicle body 2A have passed through the first position $P_1$, the vehicle model data signal $S_A$, the output signal of the latch circuit 66 shown in FIG. 4, indicates "10", and the vehicle model data signal $S_A$ indicated "10" is fetched in the STEP 2.

Next, in STEP 3 the CPU 33 carries out a vehicle model identification processing on the basis of the vehicle model identification data signal $S_A$ fetched in the STEP 2. Then, in STEP 4 positioning mode signal $SM_1$ is output to the positioning controller 39 shown in FIG. 2 in the travel controller 31 to inhibit the output of the tracking mode signal $SM_2$.

It should be noted that the stop processing of the signal $SM_2$ during the first execution of STEP 4 is meaningless, i.e., not carried out at the first execution thereof.

Next, the CPU 33 outputs a positioning mode signal Sp to the analog switch 41 in the travel controller 31 shown in FIG. 2 to turn on the switch 41 at a STEP 5 and outputs a movement point data [Px] indicating a predetermined target position in the movement range Lx according to the appropriate position in the vicinity of which the desired rear windshield feeder is arranged which supplies the rear windshield corresponding to the vehicle model identified on the basis of identification processing at the STEP 3 to the positioning controller 39.

Since the identified vehicle model is the hardtop type at this time, the CPU 33 outputs the movement point data [Px] indicating the predetermined target position in the movement range Lx according to the appropriate position in the vicinity of which the rear windshield feeder 10 is arranged which supplies the rear windshield 12 for the hardtop model.

The CPU 33 waits for the positioning completion signal $S_N$ from the positioning controller 39 in the travel controller 31 to be input at the subsequent STEP 6.

When the travel controller 31 receives the positioning mode signal $SM_1$ from the microcomputer 30, the positioning controller 39 enters in a positioning control operation mode. Next, when the travel controller 31 receives the positioning mode signal Sp and movement point data [Px] from the microcomputer 30, the analog switch 41 is turned on and positioning controller 39 starts the positioning control.

In detail, the positioning controller 39 in the operation mode of positioning control, immediately starts outputting a speed command data VD according to a difference between the movement position data [Px] and current position data of the movable base 4 calculated from the pulse signal Fp from the pulse generator 51 (data [PPx] indicates initially the positional data of the origin Po).

After the speed command data VD is converted into analog signal Svo by means of the D/A converter 40, the analog speed command signal Svo is outputted to the adder 42 via the analog switch 41. The deviation signal Ds is outputted to the motor 49 via the amplifier 43 which is based on the difference between the speed command signal Svo and feedback signal Sv' from the tachogenerator 50 so that the motor 49 starts rotation. Thus the movable base 4 on which the robot 5 is mounted starts to move toward the target position indicated by [Px].

Then, when the movable base 4 arrives at the target position in the movement region Lx which is determined according to the position at which the rear windshield feeder 10 is arranged, the speed command data VD becomes zero which has been output by the positioning controller 39 and the movable base 4 is positioned and stopped at its target position. The positioning controller 39, in turn, outputs the positioning completion signal $S_N$ to the microcomputer 30.

It should be noted that since the analog switch 46 of the travel controller 31 is turned on only if the tracking mode on signal $S_T$ from the microcomputer 30 is output, the addition signal $S_F$ is not input to the adder 42 during the positioning control (in this case, $S_F=Sv'$).

The CPU 33 receives the positioning completion signal $S_N$ from the positioning controller 39 of the travel controller 31. At this time, upon confirmation that the movable base 4 has been positioned at the target position by fetching the current position data [PPx] of the movable base 4 from the positioning controller 39, the routine advances from STEP 6 in FIG. 7(A) to STEP 7 to output a robot operation program direction data RP for the rear windshield pick-up via the robot controller 28 shown in FIG. 1 and FIG. 2. Then, in STEP 8, the CPU 33 outputs the robot operation start command SSR to the robot controller 28, and waits for the operation completion signal $S_E$ from the robot controller 28 to be input thereto in the subsequent STEP 9. It is noted that RP denotes a data based on the identified vehicle model executed in STEP 3 and which specifies the program previously taught for executing the pick-up operation for the rear windshield 12.

When the robot controller 28 receives the robot operation direction program RP for the rear windshield pick-up from the microcomputer 30, the robot controller 28 selects the teaching program corresponding to the teaching data RP from among the various teaching programs stored in its memory and plays same back the robot 5 in accordance with the the selected teaching program when receiving the robot operation start command SSR from the microcomputer 30.

Since the teaching program is selected for pick-up of the rear windshield 12, the robot 5 follows the program and picks up the rear windshield 12 so as to grasp the rear windshield 12 for the hardtop-type vehicle body 2A on the rear windshield feeder 10 as shown in FIG. 1 utilizing the mechanical hand of the suction type (hereinafter called the picking operation).

The grasped rear windshield 12 is then lifted at a required height taught by the teaching program. When a series of playing-back operations is ended for the picking operation, the robot controller 28 outputs the operation completion signal $S_E$ to the microcomputer 30.

The CPU 33 outputs the movement point data [Px] indicating another predetermined target position of the movable base 4 in the movement range Lx corresponding to the position at which the adhesive applicator 14 is arranged to the positioning controller 39 in a STEP 10. Thereafter, in a STEP 11, the CPU 33 waits for the positioning completion signal $S_N$ to be input from the positioning controller 39.

The positioning controller 39 of the travel controller 31 is in the operation mode of the positioning control when the movement point data [Px] corresponding to the target position at which the adhesive applicator 14 is arranged is received from the microcomputer 30. In addition, since the analog switch 41 only is turned on, the positioning controller 39 receiving the movement point data [Px] controls the rotation of the motor 49 in order to move the movable base 4, on which the robot 5 grasping the rear windshield 12 is mounted, toward that target position and to position the base 4 thereat.

Upon completion of positioning the movable base 4 at the target position indicated by the movement point data [Px], the positioning controller 39 outputs the positioning completion signal $S_N$ to the microcomputer 30.

Upon receipt of the positioning completion signal $S_N$ from the positioning controller 39, the CPU 33 fetches the current position data [PPx] of the movable base 4 from the positioning controller 39 and confirms that the movable base 4 has positioned at the target position. Thereafter, the routine advances from the STEP 11 to a STEP 12 in which the CPU 33 outputs another robot operation program direction data RP for applying the given amount of adhesive over a predetermined surface of the rear windshield 12 to the robot controller 28. In the next STEP 13, the CPU 33 outputs the robot operation start command SSR to the robot controller 28. Thereafter, the CPU 33 waits for the operation completion signal $S_E$ to be input from the robot controller 28 in a STEP 14.

The robot controller 28 upon receipt of the robot operation program direction data RP indicating the adhesive application from the microcomputer 30, selects the teaching program corresponding to the indication data RP from among the various teaching programs stored in the memory. Upon receipt of the robot operation start command $S_{SR}$ from the microcomputer 30, the robot controller 28 commands the robot 5 to carry out the application of adhesive on an edge (predetermined) surface of the rear windshield 12.

During the command or playback operation, the robot controller 28 outputs the application command $S_G$ to the applicator controller 32 shown in FIG. 2 at a time when a predetermined point along the edge of the rear windshield grasped by the hand of the suction type is placed at the nozzle 14a of the adhesive applicator 14 typically shown in FIG. 1 so that the adhesive flows out of the nozzle 14a. When the given amount of adhesive has been applied along the entire edge surface of the rear windshield, the robot controller 28 stops the output of the application command $S_G$ to interrupt the flow of the adhesive from the nozzle 14.

When the robot 5 takes a position as commanded after the application of adhesive is complete in a series of command operations for application of the adhesive, the robot controller 28 outputs an operation completion signal $S_E$ to the microcomputer 30.

When the CPU 33 receives the operation completion signal $S_E$ from the robot controller 28, the routine advances from the STEP 14 to a STEP 15 in which the CPU 33 outputs the movement point data [Px] indicating a stand-by position for starting the tracking operation in the movement region Ly along the slat conveyor 1 shown in FIG. 1 to the positioning controller 39 of the travel controller 31. In the next STEP 16, the CPU 33 waits for the incoming of positioning completion signal $S_N$ from the positioning controller 39.

When the positioning controller 39 of the travel controller 31 receives the movement point data [Px] indicating the stand-by position for the tracking start, the positioning controller 31 immediately moves the movable base 4 to the stand-by position and controls the rotation of the motor 49 to position the base 4 at the stand-by position.

It is noted that when the movement point data [Px] is inputted to the positioning controller 39, the operation mode has been in the mode of the positioning control and the analog switch 41 only is turned on.

Upon completion of the positioning with the movable base 4 moved at the stand-by position indicated by the movement point data [Px], the positioning controller 39 outputs the positioning completion signal $S_N$ to the microcomputer 30.

When the positioning completion signal $S_N$ is received from the positioning controller 39, the CPU 33 fetches the current position data [Px] from the positioning controller 39 to confirm that the movable base 4 is correctly waiting at the above-described stand-by position. Thereafter, the CPU 33 waits for the preparation signal $S_B$ having the level of "1" to be input in a STEP 17.

After the vehicle body 2A shown in FIG. 1 has passed through a light path of the optoelectrical switch located at the first position $P_1$, the vehicle body 2A is carried substantially at the carrying speed of 2.2 m/min. toward the downstream position. When the front pillars 2c of the vehicle body 2A have arrived at the light path of the optoelectrical switch at the second position $P_2$ shown in FIG. 1 and interrupts the light path, the preparation signal $S_B$, i.e., Q output of the F/F 69 in FIG. 5 rises from "0" to "1".

Figure 7B:
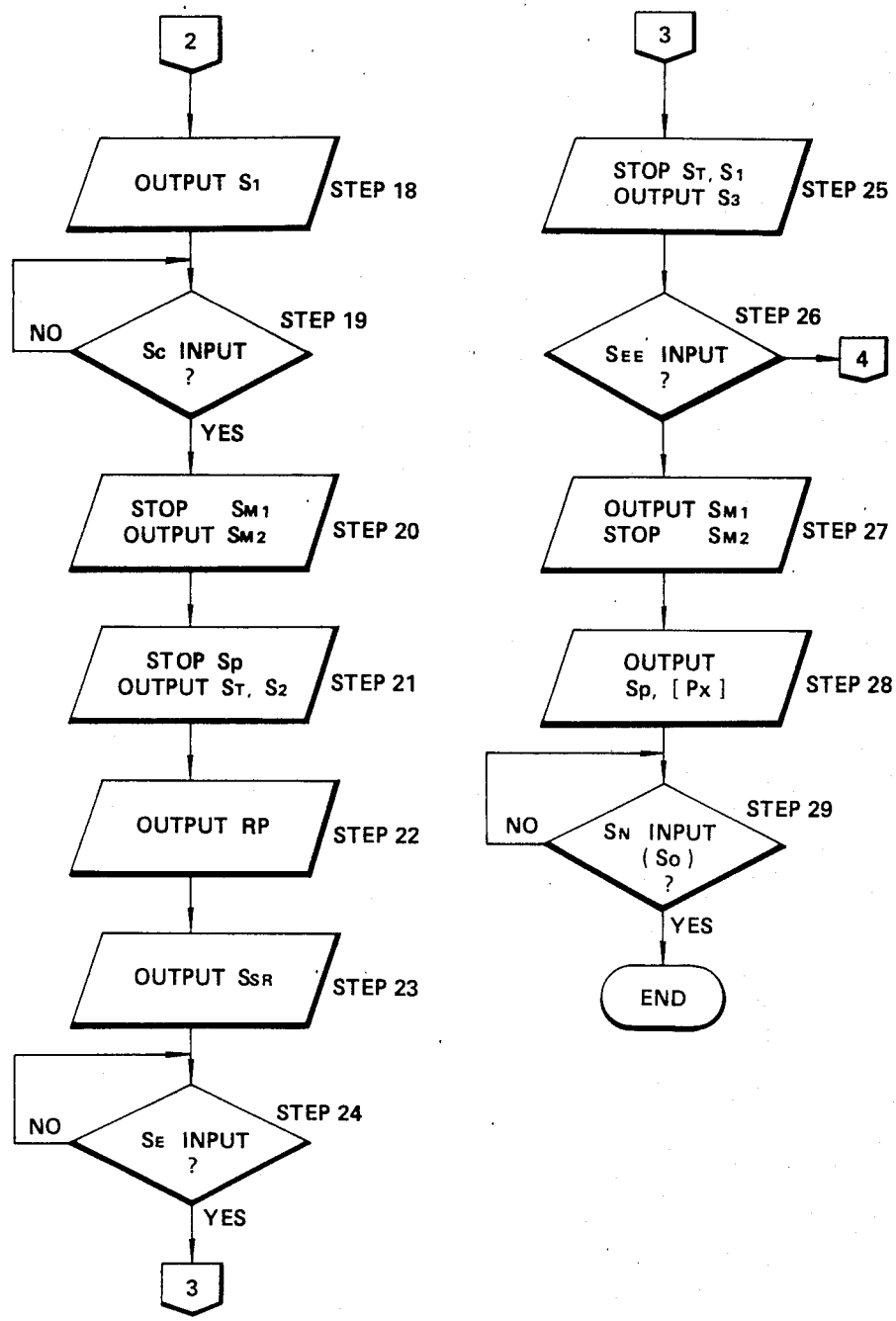

When the CPU 33 receives the preparation signal $S_B$ which has risen from "0" to "1", the routine goes from the STEP 17 to a STEP 18 shown in FIG. 7(B), in which the CPU 33 sends the clock start/stop command $S_1$ indicating the start the clock to the clock generator 52 in the actuation detection processing circuit 38 in the tracking position detector 8 shown in FIG. 3 and sends an illumination command to driver circuit (not shown) in the spot light source 9 to illuminate the spot light source.

Thereafter, the routine goes to a STEP 19 in which the CPU 33 waits for the tracking start timing signal Sc to be input from the actuation detection processing circuit 38.

When the clock start/stop command $S_1$ indicating the clock start is output to the clock generator 52 of the actuation detection processing circuit 38, the clock generator 52 starts to output the clock signal cp, thus the line image sensor 37 starting output of the video output VS.

It is noted that since the spot light from the spot light source 9 falls on a space of the rear wheel house 2d of the vehicle body 2A, the spot light is not reflected on the line image sensor 37 of the tracking position detector 8.

Figure 8:
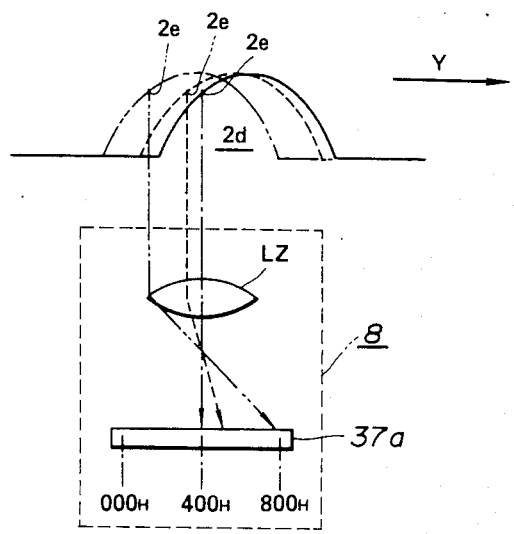
FIG. 8 is an explanatory view for explaining an action of a tracking position detector 8 shown in FIG. 2.
Figure 9:
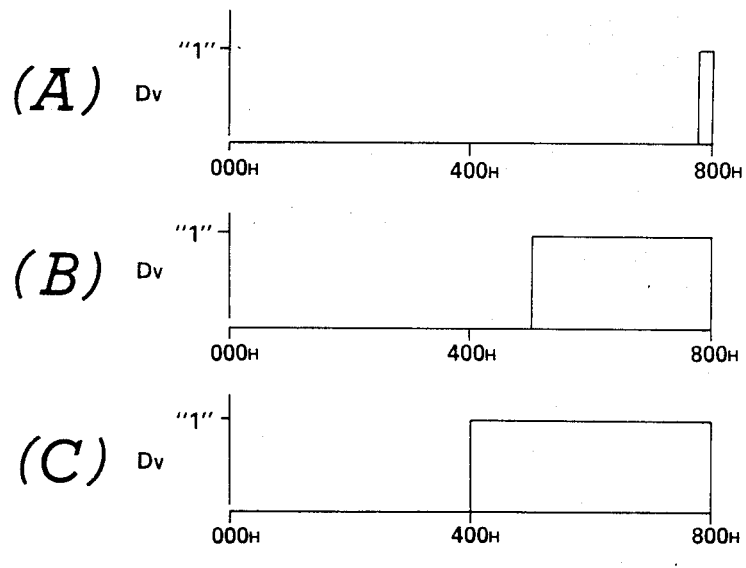
FIGS. 9(A) through 9(C) are waveform charts for indicating different examples of patterns of binary coded video data DV per scanning.

When the vehicle body 2A is carried toward the Y direction and the side edge 2e of the rear wheel house 2d is advanced to a position on which the spot light from the light source 9 falls, the spot light reflected in the vicinity of the side edge 2e is incident on the light receiving section 37a of the line image sensor 37 in the tracking position detector 8, e.g., as shown in FIG. 8 via a lens Lz.

For example, if the number of 2048 addresses for 2048 picture elements arrayed along the Y direction in the light receiving section 37a becomes larger along the Y direction, the reflected light from the side edge 2e of the rear wheel house 2d is first incident on one of the picture elements in the 800H (hexadecimal representation) address along the route indicated by a dot-dash-dash (phantom) line by the action of the lens Lz. Thereafter, as the side edge 2e advances toward the Y direction, the position at which the reflected light from the side edge 2e is incident is inversely advanced toward address of 000H as indicated by the broken line and dot-and-dash line.

In this way, when the reflected light of the spot light from the vehicle body 2A is incident on the light receiving section 37a, the line image sensor 37 sequentially scanned on the basis of the clock pulse cp output from the clock generator 52 shown in FIG. 3 outputs a vide output VS in a time sharing mode for each scanning such that the signal level is low for one of the picture elements on which the reflected light does not fall and the signal level is high for another of the picture elements on which the reflected light falls, the levels thereby determined according to a position on which the reflected light is incident during the scanning.

The binary code circuit 54 encodes the video output VS sequentially in the binary code so that the only binary coded video data DV to picture elements on which the reflected light is a "1", e.g., as shown by FIGS. 9(A), (B), and (C).

When the side edge 2e in the rear wheel house 2d of the vehicle body 2A has arrived at the reference point ($400_H$), i.e., the center position of the light receiving portion 37a and the binary coded output $D_V$ by one scanning is outputted from the binary code circuit 54 as shown in FIG. 9(C), the count value Nx of the counter 53 shown in FIG. 3 which counts the number of clocks in the clock signal cp from the clock generator 52 for each scanning (clock signal cp for 2048 pulses) to detect the position of the scanned picture element, indicates $400_H$ and the output level of the comparator 57 consequently indicates 37 1". At this time, the output level of the AND gate circuit 58 changes from "0" to "1". The output level of "1" of the AND gate circuit 58 is output to the microcomputer 30 shown in FIG. 2 as the tracking start timing signal Sc and the count value Nx of $400_H$ is latched by the latch circuit 59. When the count value Nx of "$400_H$" is latched by means of the latch circuit 59, the output $\Delta y$ of the subtraction circuit 51 indicates zero and relative position deviation signal $\Delta Sy$ also indicates zero.

Upon receipt of the tracking start timing signal Sc from the actuation detection processing circuit 38, the routine advances from the STEP 19 to a STEP 20 in which the CPU 33 outputs the tracking mode signal $SM_2$ to the positioning controller 39 of the travel controller 31 shown in FIG. 2 to interrupt the output of the active positioning mode signal $SM_1$.

The routine advances from the STEP 20 to a STEP 21 in which the CPU 33 stops the output of (turns off) the positioning mode signal Sp which has turned on the analog switch 41 of the travel controller 31. In turn, the tracking mode signsl $S_T$ is output to the analog switch 46 to cause the switch 46 to turn on and outputs the detection start command $S_2$ to the actuation detection processing circuit 38 shown in FIGS. 2 and 3.

When the tracking mode signal $SM_2$ is input to the positioning controller 39, the positioning controller stops the positioning control which has been carried out up till now and then continues only to detect the current position [PPx] of the movable base 4 utilizing the pulse signal Fp from the pulse generator 51.

In the processing of the STEP 21, the tracking mode on signal $S_T$ is output to the analog switch 46 of the tracking controller 31. At the same time, when the detection start command $S_2$ is output to the actuation detection processing circuit 38 of the tracking position detector 8, both analog switch 46 and processing circuit 38 control the movement of the movable base 4 in the following way to allow the robot 5 to follow the slat conveyor 1.

That is to say, when the analog switch 46 is turned on in response to the tracking mode signal $S_T$, the relative position deviation signal $\Delta Sy$ indicates zero (the reason will be described later) with the edge 2e of the rear wheel house 2d reaching the reference point for the movable base side, i.e., the center position of the line image sensor 37 in the tracking position detector 8. Therefore, the reference speed signal Sv adjusted by the gain amplifier 44 and derived from the tachogenerator 48 is output to the adder 42 from the adder 45 as the addition signal $S_F$.

Since the amplifier 43 amplifies the deviation signal $\Delta S (\Delta S \propto SV)$ based on the difference between the addition signal $S_F (=SV)$ from the adder 42 and speed feedback signal Sv (Sv indicates zero at the initial time) from the tachogenerator 50 and outputs the amplified deviation signal to the motor 49, the motor 49 starts to rotate so that the movable base 4 moves along the Y direction substantially at equal speed to the carrying speed of the slat conveyor 1.

On the other hand, when the actuation detection processing circuit 38 of the tracking position detector 8 receives the detection start command $S_2$, the flip-flop circuit (F/F) 55 in FIG. 3 is set and the AND gate circuit 56 opens. At this time, the binary coded video data Dv sequentially outputted from the binary code circuit 54 is input to the latch circuit 59 via the AND gate circuit 56 and OR gate circuit 60. Thus, the count value Nx of the counter 53 is latached by means of the latch circuit 59 whenever the binary video data Dv rises from "0" to "1".

Although the count value Nx of $400_H$ is latched by means of the latch circuit 59 as described above when the side edge 2e of the rear wheel house 2d of the vehicle body 2A has reached the reference point for the movable base 4, i.e., the center position of the line image sensor 37, the latch circuit 59 latches the count value Nx indicating the position in the line image sensor 37 corresponding to the position of the side edge 2e whenever one scanning operation of the line image sensor 37 is carried out when the movable base 4 starts to move and when a minute relative position difference starts to generate in the Y direction based on the speed vibration as shown in FIG. 6 between the center position ($400_H$) of the line image sensor 37 which is the reference point at the movable base side 4 and the side edge 2e of the rear wheel house 2d of the vehicle body 2A.

Hence, a relative position deviation data $\Delta y$ calculated by the subtractor 61 indicates such a value that it indicates initially zero and thereafter indicates a value expressed as $Nx - 400_H$ (positive or negative and in another case zero) which always indicates the relative position deviation between the reference point and tracking point for one scanning of the line image sensor. The relative position deviation data $\Delta y$ is latched by the latch circuit 62 at a timing of the last bit signal $P_E$ output from the line image sensor 37 for each end of the scanning operation.

When the latch circuit 62 latches the relative position deviation data $\Delta y$ for each end of the scanning operation, the data $\Delta y$ is a data on a speed dimension basis. The data $\Delta y$ in the speed dimension is converted into analog form by the D/A converter 63. Thereafter, if the gain of the data $\Delta y$ is adjusted by the gain amplifier 64, the relative position deviation signal $\Delta Sy$ on the speed dimension basis can be obtained by which the reference speed signal Sv substantially according to the carrying speed of the slat conveyor 1 can be corrected to a signal indicating the actual carrying speed which varies minutely.

The motor 49 which rotates on the basis of the addition signal $S_F$ ($S_F = Sv + \Delta Sy$) calculated by the adder 45 in FIG. 2 to which the relative position deviation signal $\Delta Sy$ is added causes the movable base 4 to move along the movement range Ly to track the slat conveyor 1 in such a way that the relative position deviation becomes zero in the Y direction between the above-described reference point and tracking point, i.e., the relationship of the relative position between the robot 5 mounted on the movable base 4 and vehicle body 2A on the slat conveyor 1 is always constant.

Next, after the CPU 33 ends the processing executed in STEP 21 for the tracking movement of the movable base 4 to the slat conveyor 1, the routine goes to the next STEP 22 in which the CPU 33 outputs the robot operation program command data RP for attaching the rear windshield to the vehicle body 2A based on the identified vehicle model carried out in the STEP 3 in FIG. 7(A) to the robot controller 28. In the next STEP 23, the CPU 33 outputs the robot operation start command SSR to the robot controller 28. In the next STEP 24, the CPU 33 waits for the operation completion signal $S_E$ to be input from the robot controller 28.

The robot controller 28 selects a teaching program corresponding to the command data RP from among various teaching programs stored in the memory thereof upon receipt of the robot operation program command data RP for the attachment of the rear windshield from the microcomputer 30. The robot controller 28, then, commands or plays back the robot in accordance with the selected teaching program upon receipt of the robot operation start command SSR from the microcomputer 30.

Since the teaching program for attaching the rear windshield 12 used for the vehicle body 2A to the vehicle body 2A is selected, the robot 5 operates to attach the rear windshield 12, over the entire edge surface of which the given amount of adhesive has been applied, to a window frame of the vehicle body 2A through an execution of such a processing as shown in FIG. 1.

Upon completion of the above-described attachment operation, the robot controller 28 outputs the operation completion signal $S_E$ to the microcomputer 30.

In this way, the robot 5 plays back with the movable base 4 accurately tracked to the slat conveyor 1 from a predetermined timing (a time at which the tracking start timing signal Sc is generated) since a time at which the front body portion 2a of the vehicle body 2A has arrived at the second position $P_2$ in FIG. 1 (at a time at which the preparation signal $S_B$ indicates "1"). Consequently, the rear windshield 12 grasped tightly to the robot's hand 6 of the suction type can be attached to the vehicle body 2A without failure.

It should be noted that since the movement of the movable base 4 becomes slightly unstable immediately after the movable base 4 has started to track the slat conveyor 1, the timing at which the robot 5 is played back may be delayed. In addition, the robot 5 is returned to an operation origin after completion of the attachment operation of the rear windshield.

Next, the routine advances from the STEP 24 to a STEP 25 in which upon receipt of the operation completion signal $S_E$ from the robot controller 28 the CPU 33 interrupts output of the tracking mode on signal $S_T$ to the analog switch 46 of the travel controller 31 shown in FIG. 2. The CPU 33, at the same time, outputs the clock start/stop command signal $S_1$ indicating the clock stop ("0") to the actuation detection processing circuit 38, detection stop command $S_3$ thereto, and outputs an extinguishing command to the driver circuit (not shown) in the spot light source 9 to extinguish the spot light source 9.

When the analog switch 46 of the travel controller 31 is turned off due to the interruption of the output of the tracking mode on signal $S_T$, the addition signal $S_F$ is interrupted so that the motor 49 stops and movable base 4 also stops.

In addition, in the actuation detection processing circuit 38, the clock generator 52 stops the output of the clock signal cp when receiving both the clock start/stop command $S_1$ indicating the clock stop and detection stop command $S_3$ and the flip-flop circuit (F/F) 55 is reset to close the AND gate circuit 56. Therefore, the latch circuit 59 does not latch a new count value Nx any more.

The CPU 33 checks to determine whether a whole operation completion signal $S_{EE}$ is inputted from the robot controller 28 in a next STEP 26 after the processing in the STEP 25 has ended. If the whole operation completion signal $S_{EE}$ is not received, the routine returns to the STEP 3 i FIG 7(A). If the signal SEE is received, the routine advances to the next STEP 27.

It should be noted that the robot controller 28 outputs the whole operation completion signal $S_{EE}$ in response to a given command from, e.g., a sequence controller (PC) which controls sequentially various apparatus installed in the assembly line.

When the routine returns to the STEP 2 after the confirmation that the whole operation completion signal $S_{EE}$ is not received, the CPU 33 repeats the series of processings from the STEP 3 to the STEP 26 upon the fetching of the vehicle model data signal $S_A$ from the latch circuit 66 shown in FIG. 4.

If the next vehicle body 2 is the sedan vehicle body 2B as shown in FIG. 1, a rear windshield 13 for the sedan type vehicle body 2B is to be attached to a window frame of the vehicle body 2B in the same way as described above.

As appreciated from FIGS. 7(A) and 7(B), the movable base 4 is directly moved to a position at which the next rear windshield is taken out from the corresponding rear windshield feeder after the tracking movement (the stop position of the movable base 4 after the tracking movement is detected by the positioning controller 39).

If the CPU 33 confirms that the whole operation completion signal $S_{EE}$ is inputted in the STEP 26, the CPU 33 outputs the positioning mode signal $SM_1$ to the positioning controller 39 in the travel controller 31 and interrupts thereby the tracking mode signal $SM_2$ which has now been output in the next STEP 27.

The CPU 33, then, outputs the positioning mode on signal Sp to the analog switch 41 in the travel controller 31 to turn on the analog switch 41 and outputs the movement point data [Px] indicating the position of origin Po to the positioning controller 39 in a STEP 28.

In the next STEP 29, the CPU 33 waits for both signals of the positioning completion signal $S_N$ from the positioning controller 39 and origin signal So from the limit switch 47 shown in FIG. 2 to be input. The CPU 33 then completes all processings when both signals are received in the STEP 29.

The automated continuous attaching operations of rear windshields in the embodiment described above permit addition of only a small number of new facilities which are simple in construction to the present installations such as a slat conveyor without modification of the slat conveyor and other facilities which can directly utilize any type of robot, and can achieve low manufacturing cost.

Although in the above-described embodiment, the attaching of each rear windshield to the corresponding vehicle body is exemplified, the present invention is also applicable to a front windshield attachment operation stage, rear combination lamps attachment operation stage, and vehicle's seat attachment operation stage.

In addition if, in the above-described embodiment, the tracking point of the vehicle body 2 is set to the side edge 2e of the rear wheel house 2d and to, e.g., the side edge of a front wheel house and the movable base 4 tracks selectively either of both tracking points, a single robot 5 can attach both front and rear windshields to the vehicle body 2 with front windshield feeder(s) provided.

Although in the above-described embodiment the letter L type rail 3 is used, the entire movement range of the movable base 4 may be alongside of the slat conveyor 1 or alternatively only part of the movement range may be alongside of the conveyor 1 with the movement range in an endless loop form.

Although in the above-described embodiment a vehicle body of either the hardtop or sedan type is identified, a vehicle body of any type of a coupe, wagon, and hatchback may be identified if necessary and a work (rear windshield, etc.) determined according to the result of identification may selectively be grasped by the robot.

In addition, although the vehicle model (hardtop or sedan) of the vehicle body 2 is determined directly at the first position $P_1$ in the above-described embodiment, the vehicle model may be identified by reading a production direction card used conventionally from a central production management computer and on the basis of the read data at a time when either of the vehicle body passes through the first position $P_1$.

Although in the above-described embodiment the preparation signal $S_B$ is formed by the switch signl $Q_3$ of the optoelectrical switch located at the second position $P_2$, the preparation signal $S_B$ having the level of "1" may be formed when the output pulse of another tachogenerator which is installed on a rotation wheel of a line end of the slat conveyor 1 on which the tachogenertor 48 is mounted is counted by means of a counter and the count value thereof reaches a predetermined value.

Furthermore, in the above-described embodiment, if the seated posture of the vehicle body 2 on the slat conveyor 1 cannot be constant, the posture of the vehicle body 2 on one of the slats 1a is detected immediately before the vehicle body 2 passes the stand-by position of the movable base 4 and the coordinate system of the robot may undergo an coordinate transformation on the basis of the detection result.

Although in the above-described embodiment, the movable base 4 is tracked to the conveyor 1 at a timing at which the tracking start timing signal Sc is generated after the vehicle body 2 has arrived at the second position $P_2$, the tracking movement may be started simultaneously when the vehicle body 2 has reached the second position $P_2$.

Since, as described hereinabove, in the method of automatically attaching a work to a vehicle body using a robot according to the present invention at least a part of a movement range of a movable base on which the robot is mounted is located along a conveyor on which each vehicle body is carried, works feeders located at predetermined positions along its movement range for supplying different kinds of works according to vehicle models of the vehicle bodies to be carried on the conveyor respectively are disposed, their vehicle types (hardtop, sedan, and so on) are identified at respective times when the vehicle bodies have reached a predetermined first position upstream of the movement range of the movable base along the conveyor, a target position in the movement range of the movable base is determined on the basis of the identification result according to the position of one of the work feeders which supplies the work corresponding to the determined vehicle type, the movable base is moved and positioned to the target position, the robot is commanded to grasp and carry the work from the corresponding work feeder at a time when the positioning is completed, the movable base is then moved and positioned to a stand-by position of a predetermined position in the movement range along the conveyor, a relative position deviation toward a carrying direction of the conveyor between a predetermined tracking point for the conveyor side and a reference point predetermined for the movable base side is sequentially detected, and the robot is commanded to attach the grasped work to a given position of the vehicle body, tracking the movable base to the conveyor so that the relative position deviation becomes zero, the series of automated attachment operations of works to the respective vehicle bodies which satisfies the above-described conditions (A) through (E) can be achieved relatively easily.

It will clearly be understood by those skilled in the art that the foregoing description is made in terms of the preferred embodiment and various modifications may be made without departing from the scope of the present invention which is to be defined by the appended claims.

What is claimed is:

1. A method for automatically attaching works to vehicle bodies carried on a conveyor, comprising the steps of:
    (a) providing a base on which a robot is mounted and which is movable within a predetermined range, at least one part of the movement range being alongside of the conveyor;
    (b) providing a plurality of work feeders for sequentially feeding plural kinds of works which are respectively different according to vehicle types of the vehicle bodies carried on the conveyor to different predetermined positions along the movement range of the movable base;
    (c) identifying the vehicle type of one of the vehicle bodies which has passed through a first position of the conveyor;
    (d) determining a target position in the movement range of the movable base corresponding to one of the predetermined positions to which the corresponding work feeder feeds the required works on the basis of the identification result in said step (c) and positioning the movable base to the target position;
    (e) controlling the robot so as to grasp one of the sequentially fed required works from the work feeder at the target position;
    (f) moving the movable base from the target position to position it at a stand-by position at the part of said movement range along the conveyor at which the movable base waits for a tracking operation to start;
    (g) detecting by means of a detector located on the movable base, a deviation of a relative position in a direction of travel of the conveyor between at least one predetermined tracking point located on the conveyor and a reference point located on the movable base at a predetermined time after one of the vehicle bodies which has passed through the first position and arrived at a second position of the conveyor downstream of the first position; and
    (h) moving the movable base to follow the conveyor so that the detected deviation of the relative position becomes zero in said step (g) and simultaneously controlling the robot so as to attach the grasped work to a predetermined portion of the vehicle body.

2. The method according to claim 1, wherein the required works are rear windshields and which further comprises the steps of:

(i) providing an adhesive applicator at another predetermined portion along the movement range of the movable base;

(j) moving and positioning the movable base to another target position corresponding to the predetermined position of the adhesive applicator before said step (f); and (k) controlling the robot so as to apply a given amount of adhesive over a predetermined surface of the rear windshield after said step (j).

3. The method according to claim 1, wherein said step (c) is carried out by providing two optoelectrical switch means, one located at the first position and detecting whether a front body of one of the vehicle bodies on the conveyor has passed through the first position and the other located at a third position and detecting whether a center pillar of one of the vehicle bodies on the conveyor is present when the front body of the corresponding vehicle body has passed through the first position.

4. The method according to claim 1, wherein an optoelectrical switch means located at the second position detects that a front pillar of the vehicle body has arrived at the second position in said step (g).

5. The method according to claim 4, wherein said step (g) comprises the steps of:

(i) providing a clock generator for outputting a clock signal having a predetermined frequency in response to a signal from said optoelectrical switch means indicating that the front pillar of the vehicle body has reached the second position;

(k) illuminating a spot light source on the movable base, the spot light directing light toward a rear wheel house of the vehicle body, in response to the signal from the optoelectrical switch means;

(l) providing a line image sensor means having a predetermined number of picture elements along the direction of travel of the conveyor for receiving reflected light from the rear wheel house of the vehicle body, scanned sequentially on the basis of the clock signal output from the clock generator, and outputting a video output according to an incident position of the reflected light during the scanning such that a level of the video output signal is low for any picture element on which the reflected light is not incident and is high for any picture element on which the reflected light is incident;

(m) encoding in a binary code the video output from the line image sensor means for each scanning to output a binary coded video data;

(n) counting the clock signal from the clock generator when the reflected light incident on a side edge of a rear wheel house of the vehicle body reaches the reference point corresponding to a center picture element of the line image sensor means; and (o) outputting a signal indicating that the count number of the clock signal has reached a number corresponding to the reference point at said predetermined time so that the tracking of the movable base to the conveyor is started.

6. The method according to claim 5, wherein the side edge of the rear wheel house of the vehicle body, the front pillar thereof having passed through the second position, is the tracking point located on the conveyor.

7. The method according to claim 5, wherein said step (h) comprises the steps of:

(p) providing a first tachogenerator for detecting the carrying speed of the conveyor and for outputting a reference speed signal indicative thereof;

(q) providing a second tachogenerator for detecting the rotational speed of a motor to actuate the movable base to move and for outputting a signal indicative of the speed of the movable base;

(r) counting the clock signal from the clock generator after the reflected light incident on the side edge of the rear wheel house of the vehicle body reaches the reference point of the movable base, the count value indicating a position of one of the picture elements in the line image sensor means corresponding to a position of the side edge for each scanning;

(s) calculating the relative position deviation from the count value of step (r) and the number of the center picture element for each scanning;

(t) correcting the reference speed signal from the first tachogenerator by the relative position deviation calculated in said step (s); and (u) actuating the motor on the basis of the corrected reference speed signal in said step (t) so that the movable base is moved in synchronization with the actual carrying speed of the conveyor.

8. The method according to claim 1, wherein the robot is controlled in accordance with a teaching program selected from among teaching programs previously used in steps (e) and (h).

9. The method according to claim 1, wherein said step (g) is carried out simultaneously when the vehicle body has arrived at the second position.

10. The method according to claim 1, wherein a letter L shaped rail is extended along the movement range of the movable base on which the movable base is moved, part of the rail being alongside of the conveyor.

11. A method for automatically attaching required works to main assemblies carried on a conveyor, comprising the steps of:

(a) providing a movable base on which a robot is mounted and which is movable within a movement range thereof, at least part of the movable range being alongside of the conveyor;

(b) providing a feeder for sequentially feeding required works to a predetermined position along the movement range of the movable base;

(c) determining whether one of the main assemblies on the conveyor has passed through a first position upstream of the movement range of the movable base along the conveyor;

(d) moving and positioning the movable base to a target position determined according to the predetermined position at which the feeder is arranged;

(e) controlling the robot so as to grasp one of the required works from the feeder when the movable base is positioned at the target position;

(f) moving and positioning the movable base on which the robot grasping the required work is mounted to a predetermined stand-by position of the movement range along the conveyor;

(g) determining whether the one main assembly has arrived at a second position downstream of the first position and along the movement range of the movable base; and (h) controlling the robot so as to attach the required work to the predetermined portion at a predetermined time after determining that the main assembly has arrived at the second position, tracking the movable base to the conveyor so that a relative position deviation becomes zero, the relative position deviation in the direction of travel of the conveyor between at least one predetermined tracking point for the conveyor and a reference point predetermined for the movable base being detected sequentially.

12. The method according to claim 11, wherein the determining steps (c) and (g) are carried out by determining whether a tip of the main assembly on the conveyor has obstructed light passages repectively formed at the first and second positions by means of optoelectrical switches.

13. The method according to claim 11, wherein the required works fed by the feeder are different depending on a type of one of the assemblies which has passed through the first position.

14. The method according to claim 13, which further comprising the step of identifying the type of the one assembly which has passed through the first position.

15. A system for automatically attaching works to vehicle bodies carried on a conveyor, comprising:
 (a) first means carrying a robot for moving said robot within a movement range, at least one part of which being alongside of the conveyor;
 (b) second means for feeding sequentially plural kinds of the works which are different according to vehicle types of the vehicle bodies carried on the conveyor to different predetermined positions along the movement range of said first means;
 (c) third means for identifying the vehicle type of one of the vehicle bodies which has passed through a first position of the conveyor at an upstream of the part of movement range of the movable base along the conveyor when the vehicle body has passed through the first position;
 (d) fourth means for determining a target position in the movement range of said first means corresponding to one of the predetermined positions to which said second means feeds the required works on the basis of the identification result in said third means and for positioning said first means to the target position;
 (e) fifth means for controlling the robot so as to grasp one of the sequentially fed required works from said second means with said first means positioned at the target position;
 (f) sixth means for moving said first means along the movement range thereof, said first means being moved to the target position and thereafter moved to a stand-by position of the part of the movement range alongside of the conveyor at which said first means waits for a tracking operation to start; and
 (g) seventh means for detecting sequentially a deviation of a relative position toward a direction of travel of the conveyor between at least one predetermined tracking point located on the conveyor and a reference point located on said first means, said seventh means starting detection at a predetermined timing since one of the vehicle bodies which has passed through the first position has arrived at a second position downstream of the first position, said sixth means moving said first means to follow the conveyor so that the sequentially detected relative position deviation by said seventh means becomes zero, and said fifth means controlling the robot so as to attach the grasped work to a predetermined portion of the vehicle body which has passed through the second position with said first means tracking the conveyor.

16. The system according to claim 15, which further comprises:
 (h) eighth means for detecting the carrying speed of the conveyor;
 (i) ninth means for detecting the movement speed of said first means; and
 (j) tenth means for detecting the relative position deviation between said tracking point and reference point on a speed dimension basis, said sixth means moving said first means at a speed detected by said eighth means which is corrected on the basis of the relative position deviation on the speed dimension basis detected by said tenth means so that the movement speed of said first means detected by said ninth means substantially is equal to the actual speed of the conveyor.

* * * * *